United States Patent
Tomita (10) Patent No.: US 11,117,317 B2
(45) Date of Patent: Sep. 14, 2021

(54) SHAPING METHOD FOR THREE-DIMENSIONAL SHAPED PRODUCT

(71) Applicant: Matsuura Machinery Corporation, Fukui (JP)

(72) Inventor: Seiichi Tomita, Fukui (JP)

(73) Assignee: Matsuura Machinery Corp., Fukui (JP)

( * ) Notice: Subject to any disclaimer, the term of this patent is extended or adjusted under 35 U.S.C. 154(b) by 0 days.

(21) Appl. No.: 16/670,521

(22) Filed: Oct. 31, 2019

(65) Prior Publication Data

US 2020/0254684 A1 Aug. 13, 2020

(30) Foreign Application Priority Data

Feb. 13, 2019 (JP) .............................. JP2019-023658

(51) Int. Cl.
| | |
|---|---|
| *B29C 64/153* | (2017.01) |
| *B29C 64/245* | (2017.01) |
| *B29C 64/268* | (2017.01) |
| *B29C 64/205* | (2017.01) |
| *B33Y 10/00* | (2015.01) |

(52) U.S. Cl.
CPC .......... *B29C 64/153* (2017.08); *B29C 64/205* (2017.08); *B29C 64/245* (2017.08); *B29C 64/268* (2017.08); *B33Y 10/00* (2014.12)

(58) Field of Classification Search
CPC ... B29C 64/153; B29C 64/245; B29C 64/268; B29C 64/205; B29C 64/40; B33Y 10/00
USPC ......................................................... 264/497
See application file for complete search history.

(56) References Cited

U.S. PATENT DOCUMENTS

| | | | |
|---|---|---|---|
| 2005/0029711 A1* | 2/2005 | Abe ....................... | B33Y 50/02 264/497 |
| 2010/0207288 A1 | 8/2010 | Dini | |
| 2011/0278773 A1 | 11/2011 | Bokodi et al. | |
| 2012/0223462 A1* | 9/2012 | Eriksson ................ | B33Y 10/00 264/497 |

(Continued)

FOREIGN PATENT DOCUMENTS

| | | |
|---|---|---|
| JP | 2005-133120 A | 5/2005 |
| JP | 2010-261072 A | 11/2010 |

(Continued)

*Primary Examiner* — Francisco W Tschen
*Assistant Examiner* — Guy F Mongelli
(74) *Attorney, Agent, or Firm* — Richard M. Goldberg (57) ABSTRACT

A shaping method for a three-dimensional shaped product, including the following steps:
1. Setting a traveling distance of the squeegee to be a short distance that does not reach a chamber wall section,
2. Establishing location of wall layers connecting both ends at the chamber wall sections in a direction perpendicular to the traveling direction of the squeegee, within a traveling range based on the set traveling distance, or connecting to the ends on a powder feeder side at inner side of the chamber wall sections by a region to be sintered, from both sides of the region,
3. Forming powder layers by movement of the squeegee over the set traveling distance,
4. Forming sintered layers by irradiation with a beam on the formed powder layers, and forming wall layers by irradiation with a beam at the locations of the established wall layers,
5. Repeating steps 3 and 4.

8 Claims, 5 Drawing Sheets

(56) References Cited

U.S. PATENT DOCUMENTS

| | | | | |
|---|---|---|---|---|
| 2015/0328836 A1* | 11/2015 | Okazaki | ............ | B22F 12/00 425/174.4 |
| 2016/0243805 A1* | 8/2016 | Satoh | ............ | B29C 64/153 |
| 2017/0209954 A1* | 7/2017 | Kato | ............ | B33Y 10/00 |
| 2018/0111319 A1* | 4/2018 | Brezoczky | ............ | B33Y 40/00 |
| 2018/0345378 A1 | 12/2018 | Holford et al. | | |

FOREIGN PATENT DOCUMENTS

| | | | |
|---|---|---|---|
| JP | 2011-251529 | A | 12/2011 |
| JP | 2015-150825 | A | 8/2015 |
| JP | 2015-157423 | A | 9/2015 |
| JP | 2017-88947 | A | 5/2017 |
| JP | 2018-24183 | A | 2/2018 |
| JP | 2018-162488 | A | 10/2018 |
| JP | 6458182 | B1 | 1/2019 |

\* cited by examiner

SHAPING METHOD FOR THREE-DIMENSIONAL SHAPED PRODUCT

TECHNICAL FIELD

The present invention relates to a shaping method for a three-dimensional shaped product that is to be used for formation of powder layers, wherein the powder layer-forming region is not the entire region on the shaping table corresponding to the full traveling distance of the squeegee, but rather a partial region on the shaping table determined by shortening the traveling distance of the squeegee.

Background of the Invention

Figure 5A:
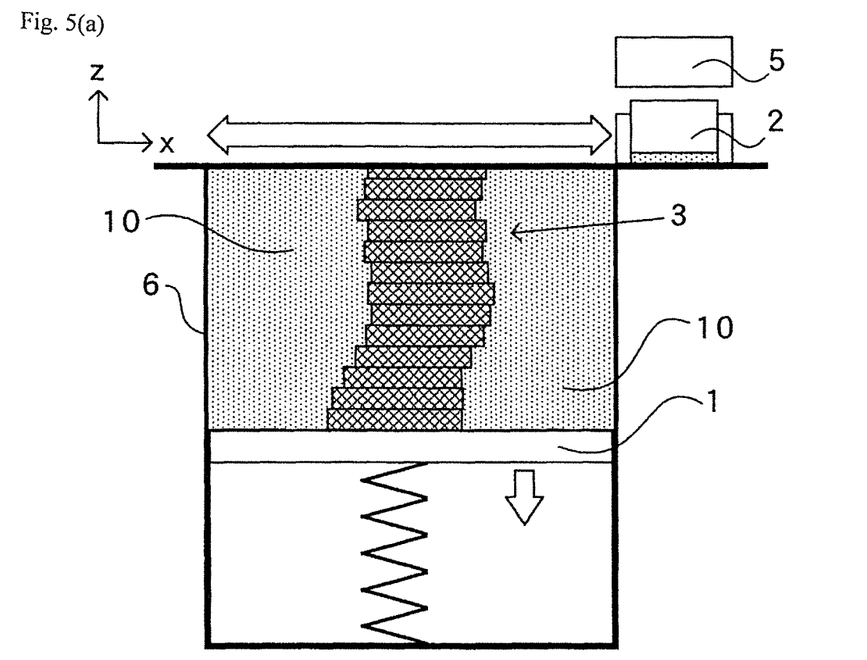

In shaping methods for three-dimensional shaped products in the prior art, as shown in FIG. 5(a), powder layers are successively formed in a connected state with the wall sections of a chamber, corresponding to the full traveling distance of the squeegee over the entire region on the shaping table, and sintered layers are successively formed by irradiation with a laser beam or electron beam.

Figure 5B:
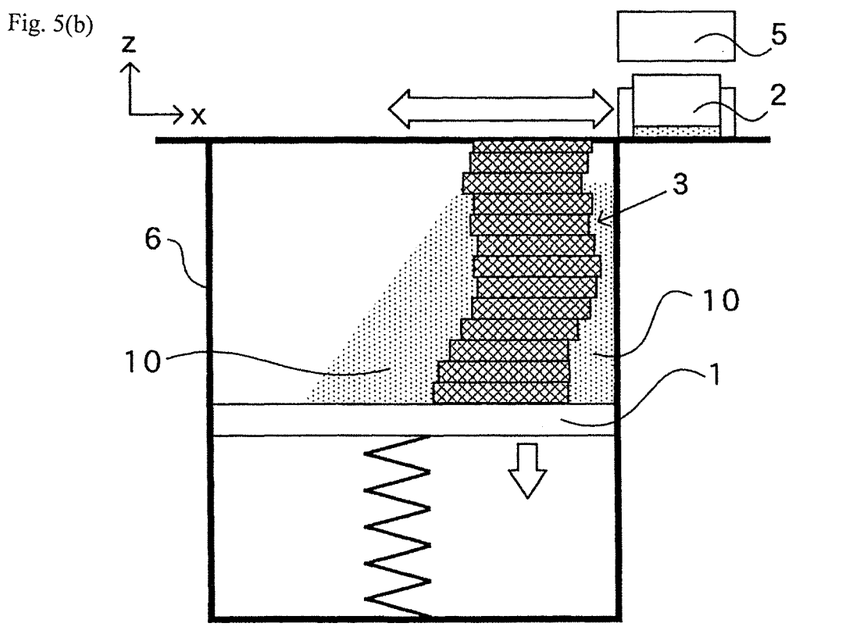

The powder layers are formed over the entire region because if the powder layers are formed while connected only with the wall sections on only one side within the chamber, over a partial region on the shaping table, after which sintered layers are successively formed, then as the powder layers and sintered layers are successively laminated, the powder layers that are on the side separated from the powder feeder will be unable to maintain their own form as shown in FIG. 5(b), and the laminated powder layers will successively collapse from the upper region.

However, when powder layers are formed while connected to the interior wall sections of the chamber over the entire region on the shaping table corresponding to the full traveling region of the squeegee, regardless of the shaping range or shaping location of the three-dimensional shaped product, as shown in FIG. 5(a), then for most three-dimensional shaped products, this means that excess powder layers are formed, and the working efficiency by movement of the squeegee is not always satisfactory.

In addition, at the sites where three-dimensional shaped products are actually shaped, gaps are present between the chamber wall sections and the shaping table, and when powder is successively laminated on the shaping table as shown in FIG. 5(a), it is impossible to avoid the problem that considerable amounts of powder fall from the gaps.

The prior art, however, provides no suggestion for methods of overcoming the issues of forming excess powder layers, falling powder and inefficient movement of the squeegee.

Incidentally, in order to solve these basic problems of the background art, it is considered essential to set the traveling distance of the squeegee on the shaping table to be shorter than the full traveling distance which is based on the chamber wall sections, but while the prior art mentions various modifications to the traveling direction of the squeegee as described in Patent Documents 1 and 2, it neither discloses nor suggests setting a shorter squeegee traveling distance.

PRIOR ART DOCUMENTS

Patent Documents

Patent Document 1: Japanese Published Unexamined Patent Application No. 2015-150825

Patent Document 2: Japanese Published Unexamined Patent Application No. 2015-157423

SUMMARY OF INVENTION

Technical Problem

It is an object of the present invention to provide a shaping method for a three-dimensional shaped product that avoids formation of excess powder layers and can improve working efficiency for movement of the squeegee.

Solution to Problem

In order to solve the aforementioned problems, the present invention has the following basic construction.

(1) A shaping method for a three-dimensional shaped product, comprising a method for producing a three-dimensional shaped product of which the essential aspects are formation of powder layers by movement of a squeegee and dispersion of powder on the top side of a shaping table and sintering of a shaping region by irradiation with a laser beam or an electron beam, the method employing the following processes 1, 2, 3, 4, 5:

1. Setting a traveling distance of the squeegee in a linear direction after receiving supply of powder from a powder feeder, wherein a traveling distance is shorter than a full traveling distance with standard of chamber wall sections.

2. Establishing locations of linear wall section layers connecting both ends at the chamber wall sections in a direction perpendicular to a traveling direction of the squeegee, within a traveling range of the squeegee based on the traveling distance set in the process 1.

3. Forming powder layers by movement of the squeegee over the traveling distance set in the process 1.

4. Forming sintered layers by irradiation with the laser beam or the electron beam on the powder layers formed by the process 3, and forming wall layers by irradiation with the laser beam or the electron beam at the locations of the wall layers established by the process 2.

5. Repeating the processes 3 and 4 until reaching the top section of the three-dimensional shaped product.

(2) A shaping method for a three-dimensional shaped product, comprising a method for producing a three-dimensional shaped product of which the essential aspects are formation of powder layers by movement of a squeegee and dispersion of powder on the top side of a shaping table and sintering of a shaping region by irradiation with a laser beam or an electron beam, the method employing the following processes 1, 2, 3, 4, 5:

1. Setting a traveling distance of the squeegee in a linear direction after receiving supply of powder from a powder feeder, wherein a traveling distance is shorter than a full traveling distance with standard of chamber wall sections.

2. Establishing locations of linear wall section layers connecting to the ends on the powder feeder side at inner side of the chamber wall sections from both sides of a region that is to be sintered with a state surrounding the region, within a traveling range of the squeegee based on the traveling distance set by the process 1.

3. Forming powder layers by movement of the squeegee over the traveling distance set in the process 1.

4. Forming sintered layers by irradiation with the laser beam or the electron beam on the powder layers formed by the process 3, and forming wall layers by irradiation with the laser beam or the electron beam at the locations of the wall layers established by the process 2.

5. Repeating the processes 3 and 4 until reaching the top section of the three-dimensional shaped product.

Advantageous Effects of Invention

According to the present invention that is founded on the basic constructions (1) and (2), by forming the powder layer by the process 3 with the traveling distance of the squeegee set by the process 1 and as in the process 4 successively forming not only the sintered layers but also the wall layers with the location established by the process 2 and laminating these layers, collapse at the regions of the powder layer on the opposite side from the powder feeder is prevented, and as a result it is possible to avoid formation of excess powder layers while also improving the operating efficiency of the squeegee.

Furthermore, since very little or no formation of powder layer occurs at the outer sides of the wall layers, i.e. the regions where the sintered layers are not present with respect to the wall layers, as explained below, it is possible to avoid the problem of powder falling in considerable amounts from the gaps between the chamber wall section and the ends of the shaping table.

BRIEF DESCRIPTION OF DRAWINGS

FIG. 1 is a plan view illustrating the features of Example 1, with FIG. 1(a) showing the basic construction (1), and FIG. 1(b) showing the basic construction (2). The white arrows indicate the traveling direction of the squeegee, as also applies to the subsequent plan views.

FIG. 2 is a plan view illustrating the features of Example 2, with FIG. 2(a) showing the basic construction (1), and FIG. 2(b) showing the basic construction (2).

FIG. 3 shows a flow chart illustrating the process of the invention, with FIG. 3(a) showing the basic construction (1) and FIG. 3(b) showing the basic construction (2). The letter "N" in FIG. 3(a) and FIG. 3(b) represents the number of sintered layers formed by irradiation, and the letter "K" in FIG. 3(a) represents the movement frequency when multiple squeegee movements are required for formation of one sintered layer.

FIG. 4 shows the laminated state for a three-dimensional shaped product obtained by repeating the processes 3 and 4 after the processes 1 and 2 have been carried out in the basic constructions (1) and (2), with FIG. 4(a) being a lateral cross-sectional view showing the state after completion of lamination in the basic constructions (1) and (2), FIG. 4(b) being a plan view showing the state before completion of lamination in the basic construction (1), and FIG. 4(c) being a plan view showing the state before completion of lamination in the basic construction (2).

FIG. 5 is a lateral cross-sectional view showing a construction according to the prior art, with FIG. 5(a) showing the laminated state of powder layers over the entire upper region on the shaping table, and FIG. 5(b) showing collapse of laminated powder layers from the upper region when successive powder layers have been formed on the powder feeder side, over a partial region on the shaping table.

DESCRIPTION OF THE PREFERRED EMBODIMENTS

In the basic constructions (1) and (2) as well as in the prior art, the essential indispensable features for shaping of a three-dimensional shaped product are formation of powder layers by movement of the squeegee 2 and formation of sintered layers 3 in the shaping region by irradiation with a laser beam or electron beam.

Cutting of the sintering surface and its vicinity using a cutting tool is carried out after the sintering in some cases and is not carried out in other cases, although the cutting step is indispensable for shaping of intricate shapes.

Figure 3A:
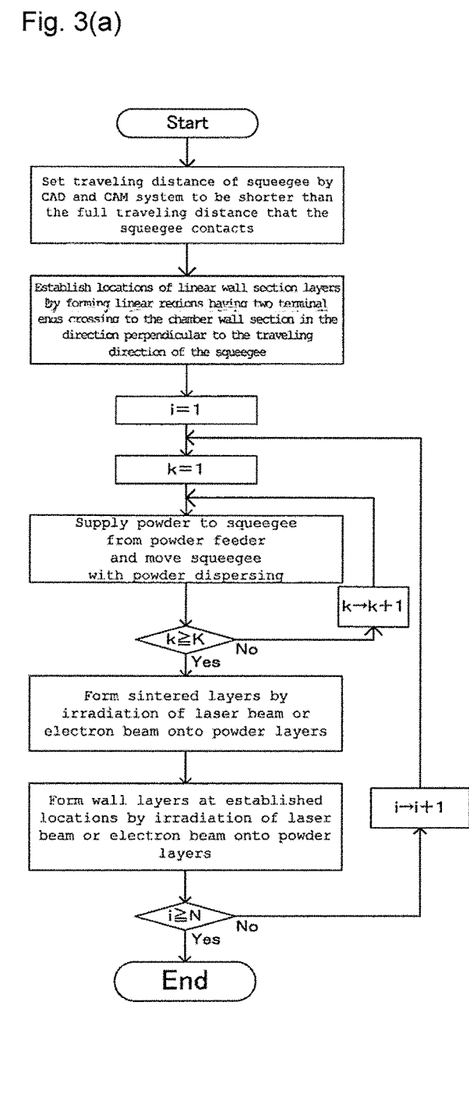

For the basic construction (1), the following steps are employed as shown in the flow chart of FIG. 3(a):

1. Setting a traveling distance of the squeegee in a linear direction after receiving supply of powder from a powder feeder, wherein a traveling distance is shorter than a full traveling distance with standard of chamber wall sections.

2. Establishing locations of linear wall section layers connecting both ends at the chamber wall sections in a direction perpendicular to a traveling direction of the squeegee, within a traveling range of the squeegee based on the traveling distance set in the process 1.

3. Forming powder layers by movement of the squeegee over the traveling distance set in the process 1.

4. Forming sintered layers by irradiation with the laser beam or the electron beam on the powder layers formed by the process 3, and forming wall layers by irradiation with the laser beam or the electron beam at the locations of the wall layers established by the process 2.

5. Repeating the processes 3 and 4 until reaching the top section of the three-dimensional shaped product.

Figure 3B:
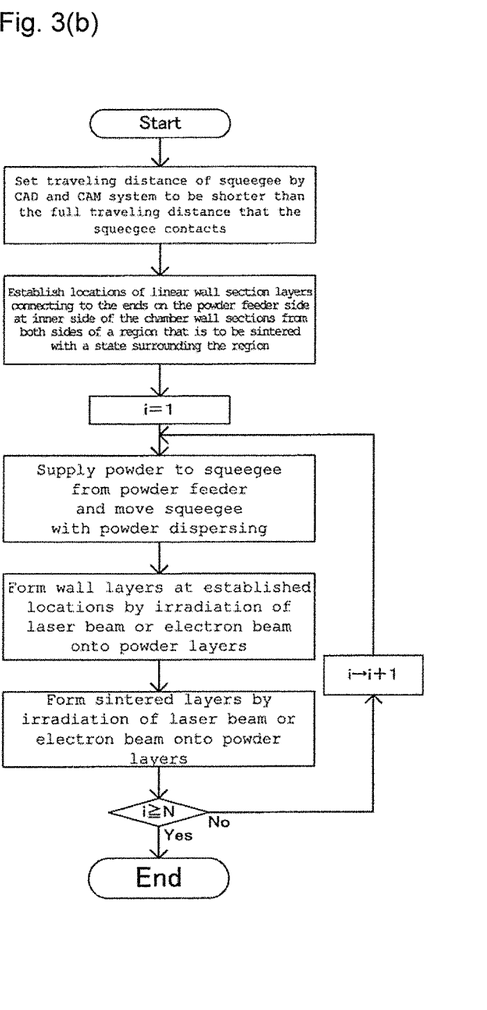

For the basic construction (2), the following steps are employed as shown in the flow chart of FIG. 3(b):

1. Setting a traveling distance of the squeegee in a linear direction after receiving supply of powder from a powder feeder, wherein a traveling distance is shorter than a full traveling distance with standard of chamber wall sections.

2. Establishing locations of linear wall section layers connecting to the ends on the powder feeder side at inner side of the chamber wall sections from both sides of a region that is to be sintered with a state surrounding the region, within a traveling range of the squeegee based on the traveling distance set by the process 1.

3. Forming powder layers by movement of the squeegee over the traveling distance set in the process 1.

4. Forming sintered layers by irradiation with the laser beam or the electron beam on the powder layers formed by the process 3, and forming wall layers by irradiation with the laser beam or the electron beam at the locations of the wall layers established by the process 2.

5. Repeating the processes 3 and 4 until reaching the top section of the three-dimensional shaped product.

As clearly seen in each of the aforementioned processes, the basic constructions (1) and (2) differ with each other in the shape of the wall layers 4 that are formed in a linear shape in the process 2, while the other processes 1, 3 and 4 are the same.

FIG. 3(a) describes a state in which the sintered layers 3 are formed before forming the wall layers 4 and each powder layer is formed by several movements of the squeegee 2, but this state may also be applied for the basic construction (2).

Likewise, FIG. 3(b) describes a state in which the wall layers 4 are formed before forming the sintered layers 3 and the powder layer is formed by one movement of the squeegee 2, but this state may also be applied for the basic construction (1).

Figure 4A:
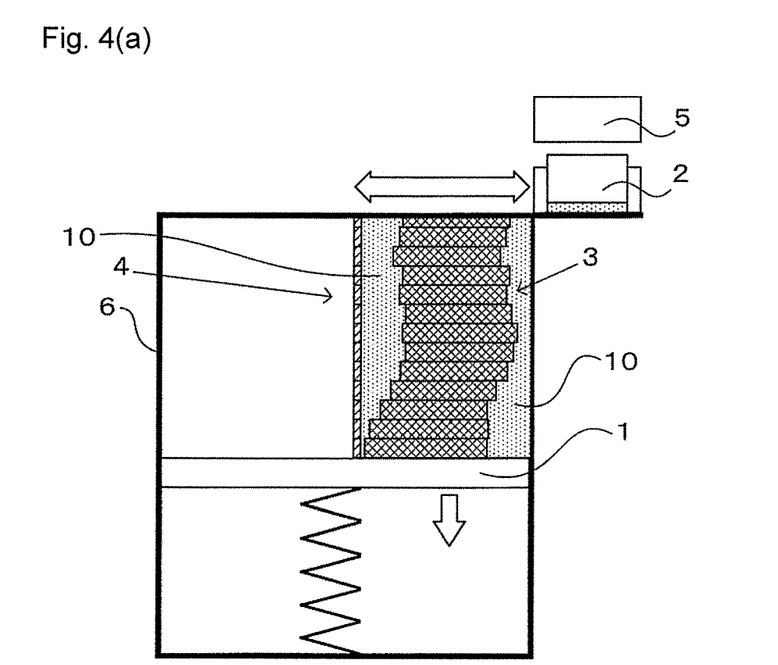

By applying each process for the basic constructions (1) and (2), as shown in the lateral cross-sectional view of FIG. 4(a), collapse of the powder layers can be avoided by superimposing not only the sintered layers 3 but also the wall layers 4, in the laminated region of the powder layers formed by the process 3, as in the process 4.

Figure 4B:
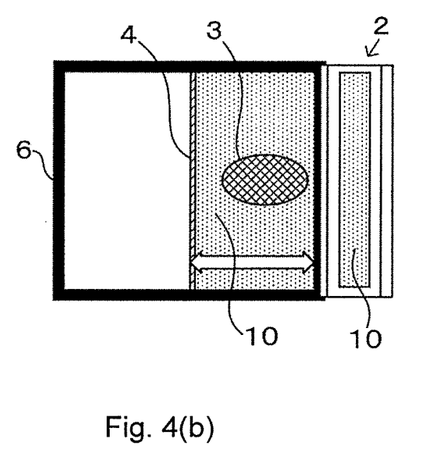
Figure 4C:
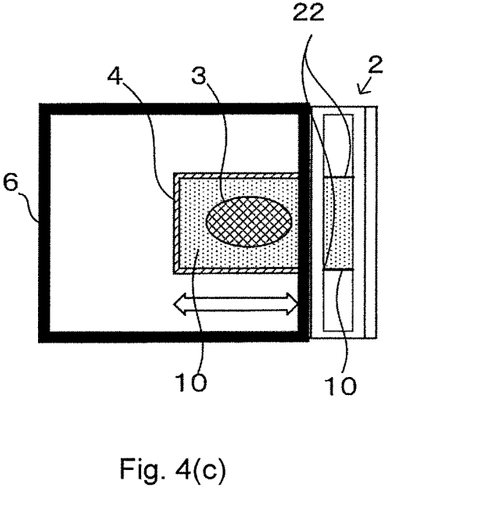

Also, by setting the traveling distance of the squeegee 2 to be shorter than the full traveling distance with reference to the chamber wall section 6, i.e. the traveling distance up until the squeegee 2 contacts or is proximal to the wall sections 6, it is possible to define the powder layer-forming region as only a partial region on the shaping table 1 for the basic constructions (1) and (2), as shown in FIG. 4(*b*) and FIG. 4 (*c*) respectively, thereby increasing the working efficiency during formation of the powder layers.

In the case of the process 2 of the basic construction (1), the linear wall section layers 4 connect at both ends at the chamber wall sections in the direction perpendicular to the traveling direction of the squeegee 2, whereas in process 2 of the basic construction (2), the wall layers 4 formed in a linear state are connected from both sides of the region that is to be sintered, to the ends on the powder feeder 5 side at inner side of the chamber wall sections, with a state surrounding that region, and therefore the shapes of the two wall layers 4 are different.

The shape of the wall layers 4 in the basic construction (1) is a more simple shape than that of the wall layers 4 in the basic construction (2).

With the basic construction (2), in contrast, there is no formation of powder layers on the outer sides of the wall layers 4 surrounding the sintering region, and therefore even more efficient use of the powder layers can be achieved.

And above said item is explained below in regard to the embodiment shown in FIG. 4(*c*).

In regard to the relationship between the locations at the ends of the powder layer and the locations at the ends of the wall layers 4, for the basic constructions (1) and (2), it is possible to employ an embodiment wherein the locations at the ends of the powder layers formed by the process 3 on the side opposite from the powder feeder 5 are in the vicinity of the locations at the ends of the wall layers 4 formed by the process 4 at the locations furthest from the powder feeder 5.

In this embodiment, partial powder layers are successively laminated on the outer side further from the powder feeder 5 than the wall layers 4, and while collapse can take place at the powder layer ends and their vicinity, the laminated state of the powder layers on the powder feeder 5 side is maintained by superimposition of the wall layers 4, making it possible to adequately avoid any large collapse of the powder layers that might hinder formation of the sintered layers 3 as shown in FIG. 5(*b*).

In addition to this embodiment, another embodiment may be employed for the basic constructions (1) and (2), wherein the powder layers formed by the process 3 have a thickness allowing them to maintain their laminated state at the ends, and the locations at the ends of the powder layers formed by the process 3 that are on the opposite side from the powder feeder 5 coincide with the locations at the ends of the wall layers 4 formed by the process 4 that are at the location furthest from the powder feeder 5.

In this embodiment, the powder layers are not formed at the regions on the outer sides of the wall layers 4, thus allowing lamination of excess powder layers to be completely avoided.

However, for lamination of the powder layers, it is absolutely essential to select a thickness that prevents the ends from collapsing.

Figure 1A:
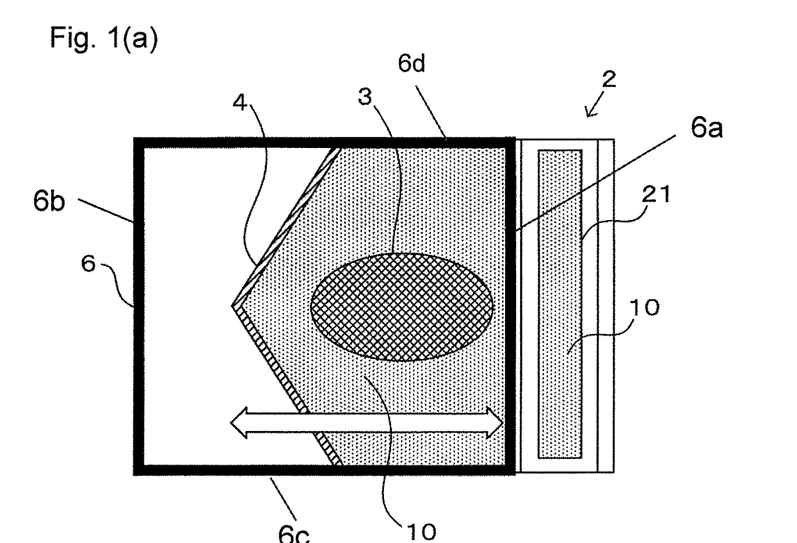
Figure 1B:
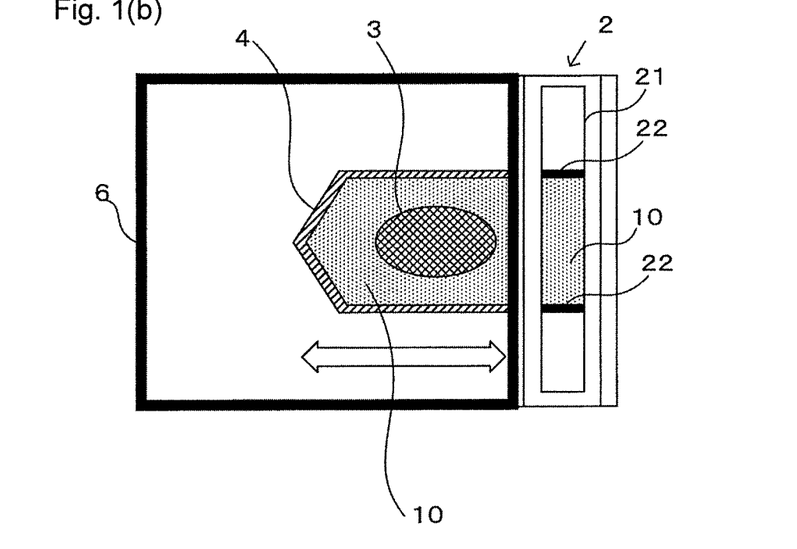
Figures 2A, 2B:
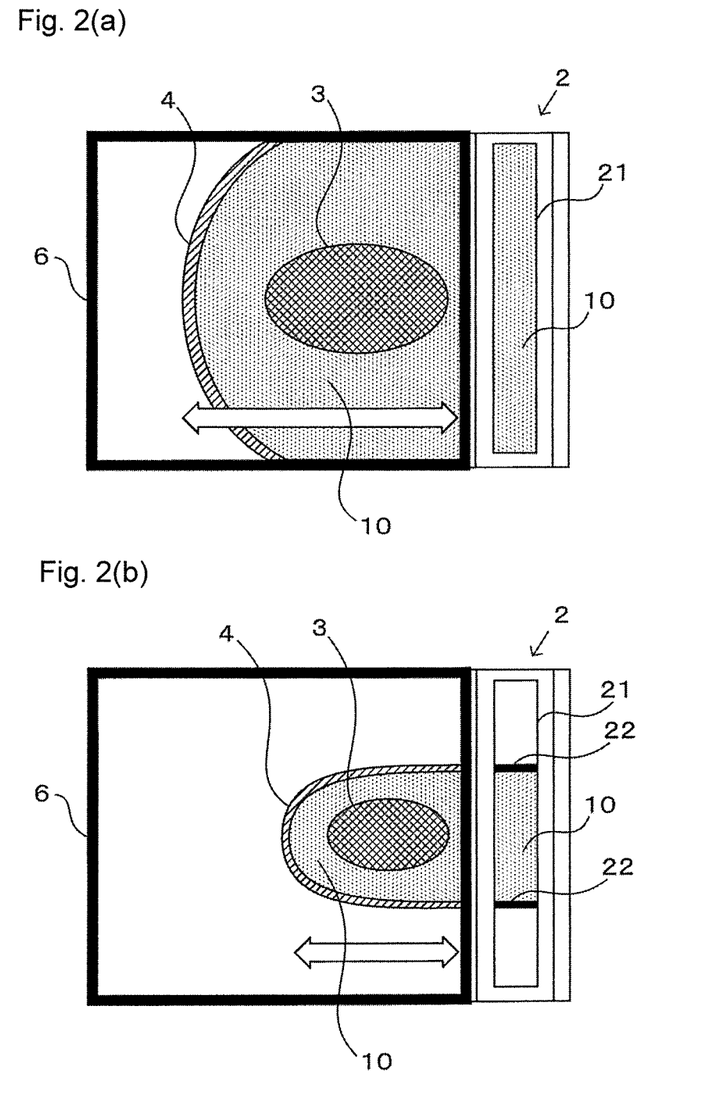

FIG. 1(*b*), FIG. 2(*b*), FIG. 4(*a*) and FIG. 4(*c*) show the state of an embodiment in which powder layers are formed near the outer ends of the wall layers 4, and FIG. 1(*a*), FIG. 2(*a*) and FIG. 4(*b*) show the state of an embodiment in which powder layers are not formed at the outer ends of the wall layers 4.

In each of these embodiments, there is either very little or absolutely no formation of powder layers on the outer sides of the wall layers 4, and it is possible to avoid problems such as falling of significant amounts of powder 10 from the gaps between the chamber wall section 6 and the ends of the shaping table 1, when the wall layers 4 are being separated from the chamber wall section 6.

Even when the outer ends of the wall layers 4 and the end of the shaping table 1 coincide and a prescribed gap is present between the end of the shaping table 1 and the chamber wall section 6, and it is necessary or preferred to completely prevent falling down of the powder layers, the problem can be solved by employing an embodiment as shown in FIG. 1(*a*), FIG. 2(*a*) and FIG. 4(*b*), wherein powder layers are not formed in the region outside of the wall layers 4.

As shown in FIG. 4(*a*), the wall layers 4 stand on premise to be laminated successively, and the thickness of the wall layers 4 in the horizontal direction is not particularly restricted and may be sufficient so as to prevent dropping out to the outer sides of the adjacent powder layers i.e. to the opposite sides from the powder feeder 5.

However, usually, with a thickness of 5 mm or greater, this will allow the dropping out to be adequately prevented in the vast majority of three-dimensional shaping.

In the case of the basic construction (2), an embodiment may be employed wherein, as shown in FIG. 4(*c*) in particular, two plates 22 are set in the frame body 21 of the squeegee 2 that receives powder 10 from the powder feeder 5 on both sides of the region of the sintered layer 3 that includes the maximum width, based on the direction perpendicular to the traveling direction of the squeegee 2, and powder 10 is supplied from the powder feeder 5 into the two plates 22, while two wall layers 4 are formed by the process 4 along the traveling direction of the two plates 22, the two wall layers 4 being connected by another wall layer 4.

In this embodiment, it is possible to reliably avoid lamination of excess powder layers even in the regions in the direction perpendicular to the traveling direction of the squeegee 2.

On the wall layers 4, it is possible to employ either an embodiment wherein the entire region is straight linear state along the direction perpendicular to the traveling direction of the squeegee 2 as shown in FIG. 4 (*b*) based on the basic construction (1), or an embodiment wherein a partial region is straight linear state along the direction perpendicular to the traveling direction of the squeegee 2 as shown in FIG. 4(*c*), and such straight linear formation allows to realize a more simple design.

However, the basic constructions (1) and (2) are not limited only to such straight linear state formation.

Hereinafter, a description will be given by following examples.

Example 1

As a feature in Example 1, the entire region of the wall layers 4 is formed in a direction diagonal to the traveling direction of the squeegee 2 as shown in FIG. 1(*a*) which is based on the basic construction (1), or a partial region of the wall layers 4 is formed in the direction diagonal to the traveling direction of the squeegee 2 as shown in FIG. 1(*b*) which is based on the basic construction (2).

As shown in FIG. 1(a), the chamber is defined by parallel, spaced apart first and second chamber wall sections 6a and 6b, which are connected at their ends by third and fourth chamber wall sections 6c and 6d. The squeegee moves from chamber wall section 6a toward chamber wall section 6b, but does not travel the entire distance between these chamber wall sections 6a and 6b. In the embodiment of FIG. 1(a), the terminal ends of the wall layers 4 extend to third and fourth chamber wall sections 6c and 6d, while in the embodiment of FIG. 1(b), the terminal ends of the wall layers 4 do not extend to third and fourth chamber wall sections 6c and 6d.

When the wall layers 4 are diagonal to the traveling direction of the squeegee 2 as in Example 1, then the wall layers 4 can be formed closer to the three-dimensional shaped product, compared to state when they are perpendicular.

As shown in FIGS. 11(a) and (b), in order to reduce formation of the powder layers on the outer side of the diagonally formed wall layers 4, i.e. on the side opposite from the powder feeder 5, it is sufficient to successively reduce the amount of powder 10 supplied in the regions on both sides of the frame body 21 of the squeegee 2 that is forming a long narrow shape.

Example 2

As a feature of Example 2, the entire region of the wall layers 4 is formed as an elliptical arc shape or arc shape with the center location of the shaping table 1 as the center as shown in FIG. 2(a) that is based on the basic construction (1), or a partial region of the wall layers 4 is formed as an elliptical arc shape or arc shape as shown in FIG. 2(b) that is based on the basic construction (2) (FIG. 2(a) shows an arc-shaped case, and FIG. 2(b) shows an elliptical arc-shaped case.).

In Example 2 as well, similar to Example 1, it is possible to form the wall layers 4 near the sintered layer 3, while also similar to Example 1, the amount of powder 10 at the squeegee 2 may be adjusted to minimize formation of excess powder layers on the outer sides of the wall layers 4.

Example 3

Example 3 stands on a shaping method for a three-dimensional shaped product in which the surface of the sintered layer 3 and its vicinity are cut after sintering of the shaping region, as a feature of Example 3, the width between the location of the end of the sintered layer 3 on the side furthest from the powder feeder 5 and the inner ends of the wall layers 4 nearest the powder feeder 5 is about the width of cut on the surface of the sintered layer 3.

Although the sintered layer 3 surface is not always cut in three-dimensional shaping, providing the aforementioned width as a basis for a three-dimensional shaped product in which cutting will be required allows maximum compactness of the region of lamination of the powder layers, and therefore maximally efficient movement of the squeegee 2 can be achieved.

INDUSTRIAL APPLICABILITY

The present invention is highly useful for avoiding lamination of excess powder layers and realizing efficient movement of the squeegee in all three-dimensional shaped product shaping methods, and it may be utilized in a wide range of all shaping methods for three-dimensional shaped products that incorporate movement of a squeegee and irradiation with a laser beam or electron beam.

REFERENCE SIGNS LIST

1 Shaping table
2 Squeegee
21 Frame body
22 Plate
3 Sintered layer
4 Wall layer
5 Powder feeder
6 Chamber wall section
10 Powder

What is claimed is:

1. A shaping method for a three-dimensional shaped product in a chamber having a first and second spaced apart chamber wall sections, and third and fourth spaced apart chamber wall sections connecting together ends of the first and second spaced apart chamber wall sections, comprising the steps of:
   formation of powder layers by movement of a squeegee in a straight linear traveling direction from a position of receiving a supply of powder by a powder feeder adjacent said first chamber wall section and moving toward the second chamber wall section,
   dispersion of powder on a top side of a shaping table and sintering of a shaping region by irradiation with a laser beam or an electron beam,
   1) setting a traveling distance of the squeegee to be shorter than a full traveling distance between the first and the second chamber wall sections,
   2) establishing locations of linear wall section layers for retaining powder used to form the three-dimensional shaped product, the linear wall section layers having two terminal ends extending to the third and fourth spaced apart chamber wall sections but spaced apart from the second chamber wall section, within a travelling range of the squeegee based on the traveling distance set in the step 1),
   3) forming powder layers for forming the three-dimensional shaped product and the linear wall section layers by movement of the squeegee over the shorter traveling distance set in the step 1),
   4) forming sintered layers by irradiation with the laser beam or electron beam on the powder layers formed by the step 3), and forming the wall section layers by irradiation with the laser beam or the electron beam at the locations of the wall section layers established by the step 2), and
   5) repeating the steps 3) and 4) until reaching a top section of the three-dimensional shaped product,
   wherein the squeegee is comprised by a straight linear frame body for receiving the powder from the powder feeder,
   wherein step 3) includes the step of forming the powder layers to have a thickness allowing them to maintain a laminated state at ends thereof, and
   further including the step of coinciding locations at ends of the powder layers formed by step 3) that are on an opposite side from the powder feeder with locations at ends of the wall layers formed by step 4) that are at a location furthest from the powder feeder.

2. A shaping method for a three-dimensional shaped product according to claim 1,
   further including the step of forming an entire region of the linear wall section layers in a direction diagonal to the traveling direction of the squeegee by the step 2) with successive reduction of an amount of powder supplied in the regions from a center position to the two terminal positions of a straight linear frame body of the squeegee, and by the step 4).

3. A shaping method for a three-dimensional shaped product according to claim 1, further including the step of forming an entire region of the linear wall section layers in one of an elliptical arc shape or arc shape with a center location of the shaping table as a center by the step 2), with successive reduction of an amount of powder supplied in the regions from a center position to the two terminal positions of a straight linear frame body of the squeegee, and by the step 4).

4. A shaping method for a three-dimensional shaped product according to claim 1, further including a step of cutting a surface of sintered layer and its vicinity after sintering of the shaping region, and wherein the location of the linear wall section layers is extended from the two terminal ends thereof at the third and fourth chamber wall sections in a direction perpendicular to the traveling direction of the squeegee in the step 2), and wherein a width between a location of an end of the sintered layer on a side furthest from the powder feeder and inner ends of the linear wall section layers along the straight linear direction of the squeegee is about a width of the cut on a surface of the sintered layers.

5. A shaping method for a three-dimensional shaped product in a chamber having a first and second spaced apart chamber wall sections, and third and fourth spaced apart chamber walls sections connecting together ends of the first and second spaced apart chamber wall sections, comprising the steps of:

formation of powder layers by movement of a squeegee in a straight linear traveling direction from a position of receiving a supply of powder by a powder feeder adjacent said first chamber wall section and moving toward the second camber wall section, dispersion of powder on a top side of a shaping table and sintering of a shaping region be irradiation with a laser beam or an electron beam, 1) setting a traveling distance of the squeegee to be shorter than a full traveling distance between the first and second chamber wall sections, 2) establishing locations of linear wall section layers for retaining powder used to form the three-dimensional shaped product, the linear wall section layers having two terminal ends spaced inwardly from the third and fourth spaced apart chamber wall sections and spaced apart from the second chamber wall section, within a traveling range of the squeegee based on the traveling distance set in the step 1), 3) forming powder layers for forming the three-dimensional shaped product and the linear wall section layers by movement of the squeegee over the shorter traveling distance set in the step 1), 4) forming sintered layers by irradiation with the laser beam or the electron beam on the powder layers formed by the step 3), and forming the wall section layers by irradiation with the laser beam or the electron beam at locations of the wall section layers established by the step 2), and 5) repeating the steps 3) and 4) until reaching a top section of the three-dimensional shaped product, wherein the squeegee is comprised by a linear frame body for receiving the powder from the powder feeder, wherein step 2) includes the step of forming the powder layers to have a thickness allowing them to maintain a laminated state at ends thereof, and further including the step of coinciding locations at ends of the powder layers formed by step 2) that are on an opposite side from the powder feeder with locations at ends of the wall layers formed by step 4) that are at a location furthest from the powder feeder.

6. A shaping method for a three-dimensional shaped product according to claim 5, further including the step of forming a partial region of the linear wall section layers in a direction diagonal to the traveling direction of the squeegee by the step 2) with successive reduction of an amount of powder supplied in the regions from a center position to the two terminal positions of a straight linear frame body of the squeegee, and by the step 4).

7. A shaping method for a three-dimensional shaped product according to claim 5, further including the step of forming an entire region of the linear wall section layers in one of an elliptical arc shape or arc shape with a center location of the shaping table as a center by the step 2) with successive reduction of an amount of powder supplied in the regions from a center position to the two terminal positions of a straight linear frame body of the squeegee, and by the step 4).

8. A shaping method for a three-dimensional shaped product according to claim 5, further including a step of cutting a surface of the sintered layer and its vicinity after sintering of the shaping region, and wherein the location of the linear wall section layers is extended from the two terminal ends thereof spaced from the third and fourth chamber wall sections in a direction perpendicular to the traveling direction of the squeegee in the step 2), and wherein a width between a location of an end of the sintered layer on a side furthest from the powder feeder and inner ends of the linear wall section layers along the straight linear direction of the squeegee is about a width of the cut on a surface of the sintered layers.

\* \* \* \* \*